Patented Feb. 17, 1942

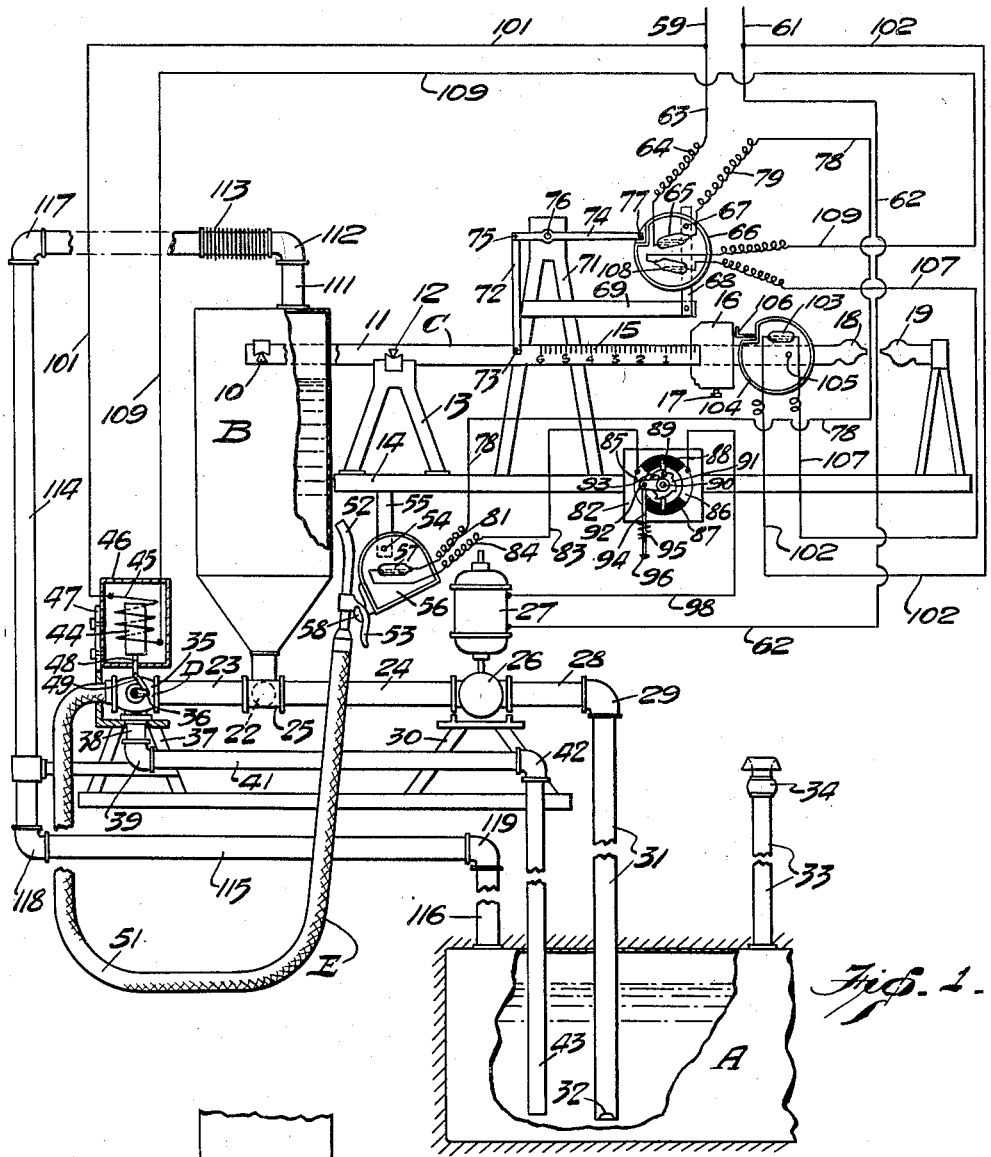

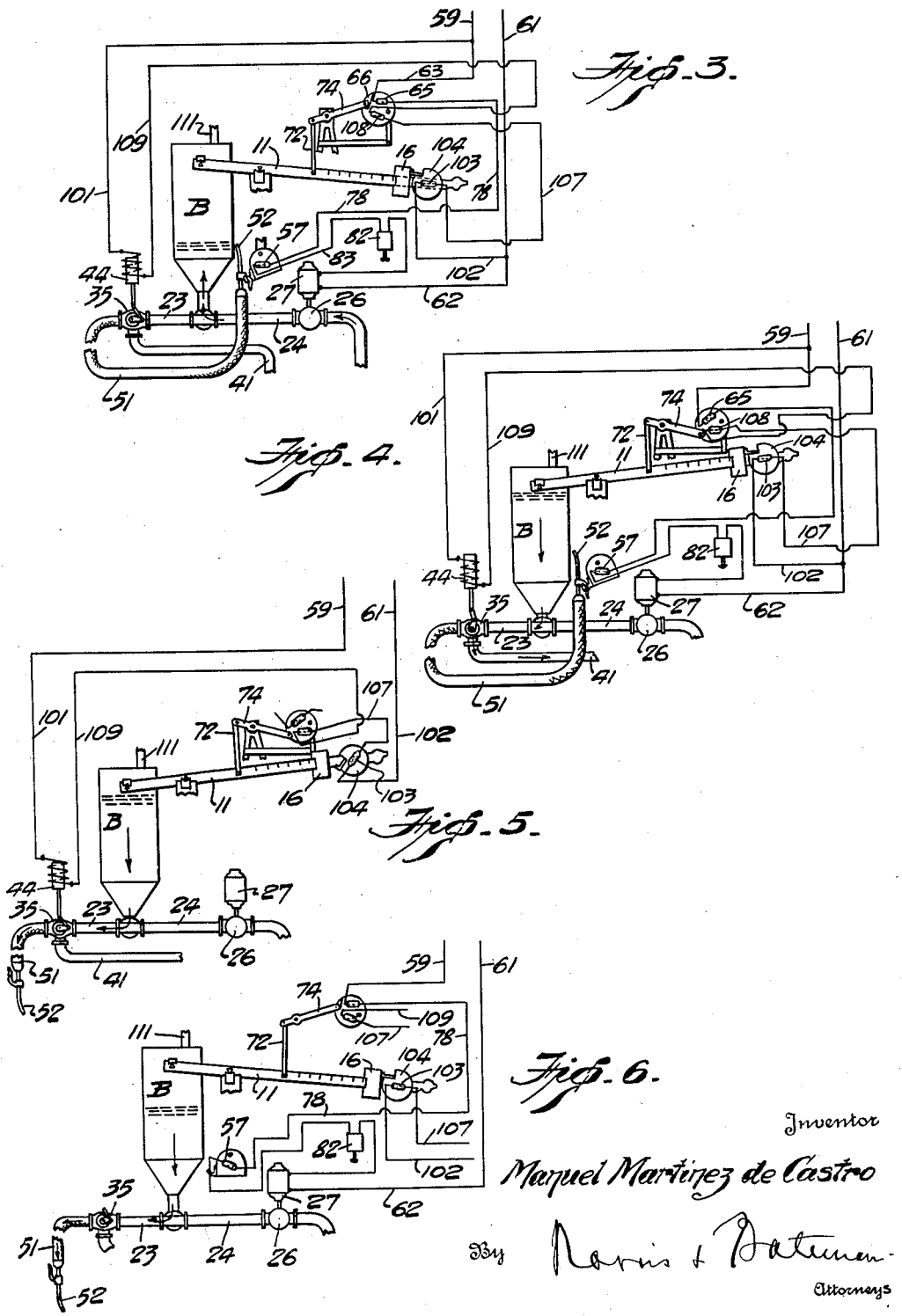

2,273,180

UNITED STATES PATENT OFFICE 2,273,180

LIQUID WEIGHING AND DISPENSING APPARATUS

Manuel Martinez de Castro, Habana, Cuba

Application June 29, 1939, Serial No. 281,941
In Cuba February 6, 1939

12 Claims. (Cl. 249—2)

This invention relates to apparatus for measuring and dispensing liquids and more particularly is concerned with apparatus for weighing gasoline, oil and other petroleum products, but it is not limited to this use and may be used for weighing liquid in general.

The common gasoline pump now in general use has been developed to a fairly high degree of volumetric accuracy, and this method of measure has been retained for want of a better method, although it is a known fact that the intrinsic worth of the particular liquid vended depends upon its weight and not its volume. Therefore, if a certain volume of liquid were purchased on a cool day it would weigh appreciably more than precisely the same volume of liquid on a warm day. Obviously, the sale of commodities according to weight insures that the amount received will be the same regardless of temperature or other atmospheric conditions.

Although apparatus have been heretofore proposed to weight and dispense liquids, they have many disadvantages and have failed to go into successful commercial use. Such prior apparatus are complicated, costly and require constant servicing to keep them in anything like working order. They are also subject to the following disadvantages:

(1) They all include a weighing tank into which the liquid is pumped and the fumes liberated incident to pumping are either allowed to freely escape into the atmosphere or means detrimental to the accuracy of the apparatus is used in an attempt to carry them away.

(2) The liquid is usually introduced into the top of the weighing tank which results in increased fume liberation, and scale fluctuations.

(3) The liquid in excess of that indicated by the device is carried away by a fixed height overflow, and as the latter is dependent upon the volume rather than the mass of liquid contained in the weighing tank the apparatus is subject to temperature changes in much the same manner as the volumetric measuring devices now in use.

(4) They also involve valves and other parts which set up friction and introduce errors into the apparatus, or else involve expensive mercury seals.

(5) No provision is made to prevent liquid from being pumped into the tank simultaneously with the withdrawal of liquid, thereby utterly destroying the accuracy of the apparatus.

It is accordingly the major object of this invention to devise a liquid weighing and dispensing apparatus which overcomes all of the disadvantages of prior apparatus, is fool- and cheat-proof, is accurate, durable and yet inexpensive to manufacture and maintain.

A further important object is to provide a novel liquid weighing apparatus which is so designed as to constitute a completely closed or hermetically sealed system, thereby positively preventing fumes developed in the liquid from escaping to the atmosphere, and yet does not impede or restrict the flow of liquid to and from the weighing tank.

Another object is to provide a novel liquid weighing apparatus embodying a weighing tank, an overflow valve and a dispensing valve, the parts being so related that the weighing tank may freely move up and down without frictional interference from the valves.

My invention also aims to provide a liquid weighing apparatus having a weighing tank and means for feeding the liquid to be weighed at the bottom of the tank, means for bleeding away excess liquid from the bottom of the tank, and means for dispensing liquid from the bottom of the tank, thereby avoiding splashing and turbulence of the liquid during operation.

Another object is to provide a liquid weighing apparatus having pump means for feeding liquid to a weighing tank and automatic means for automatically stopping the pump means when the weighing tank contains the desired weight of liquid or a slight excess weight and also having means for automatically bleeding from the tank any excess liquid only after the pump means has stopped.

Another object is to provide a liquid weighing apparatus having means for automatically stopping the flow of liquid into the weighing tank when it contains a predetermined weight of liquid, and means, operable automatically or manually, at the will of the operator, for refilling the weighing tank.

A further object is to provide a liquid weighing apparatus having means for automatically stopping the feed of liquid to the weighing tank when the scale beam attains a predetermined position and means, also controlled by the scale beam, for automatically bleeding away any liquid in excess of a predetermined weight, and means, automatically operable in response to movement of the poise, for rendering the bleeding means inoperative.

Another object is to provide a liquid apparatus embodying a weighing tank, means for feeding liquid to the tank and dispensing means for withdrawing liquid from the tank, and also having means for automatically preventing the feed of liquid into the tank unless the dispensing means is in inoperative position.

My invention also aims to provide other improvements and refinements in liquid weighing apparatus to be hereinafter pointed out.

Further objects will become apparent as the specification proceeds in connection with the annexed drawings, and from the appended claims.

In the drawings:

Fig. 1 is an elevational view of the liquid weighing apparatus of my invention and certain parts have been shown in section and others only diagrammatically illustrated, in order to comprehensively and yet briefly disclose the apparatus;

Fig. 2 is a fragmental elevational view of the bottom of the weighing tank illustrating the flexible coupling as it appears when viewed from the right-hand side of Fig. 1;

Fig. 3 is a view similar to Fig. 1 but somewhat simplified and shows the parts as they appear during the operation of filling the weighing tank;

Fig. 4 is a view similar to Fig. 3 but shows the relationship of the parts during the bleeding or overflowing operation, which automatically discharges from the tank any liquid in excess of that indicated by the poise;

Fig. 5 is similar to Figs. 3 and 4 but shows the parts as they appear at the beginning of the operation of dispensing a predetermined weight of liquid;

Fig. 6 is similar to Fig. 5, but shows the parts in the positions they assume during the operation of dispensing an indeterminate weight of liquid.

With continued reference to the drawings, wherein like reference characters have been employed to designate like parts throughout the several views thereof, and referring particularly to Fig. 1, the apparatus comprises in general a storage reservoir A, from which the liquid to be weighed is fed to a weighing tank B, supported on a scale beam C. Upon filling the weighing tank any liquid in excess of that indicated by the poise is automatically bled back to the storage reservoir by means of an automatic valve D, in a manner to be hereinafter specifically pointed out, and the liquid remaining in the weighing tank, or any desired fraction thereof, is dispensed by way of a dispensing line E.

To facilitate a clear understanding of the invention the various phases of the apparatus will be taken up separately, as follows:

*Weighing tank and adjuncts*

The weighing tank is supported on a pair of knife edge fulcrums 10 carried by a scale beam 11. The latter is provided with a pair of fulcrums which cooperate with fulcrum seats 12 carried by a pair of standards 13, mounted on a main support or supporting frame 14.

The scale beam is provided with graduations 15, in pounds or kilograms or fractions thereof, and as indicated they increase in value toward the beam fulcrum, so as to indicate the weight of liquid removed from the tank, rather than the weight added.

A poise 16 is slidably carried by the scale beam and may be locked in any desired adjusted position by means of a set screw 17. The free end of the beam terminates in a pointer 18, which cooperates with a similar pointer 19 carried by support 14, to indicate when the beam is balanced.

Although I have shown a particlar form of weighing mechanism to illustrate the invention, no claim is made to it per se and it is to be understood that any other suitable well known weighing mechanism may be employed without departing from the spirit of the invention.

*Feed of liquid to weighing tank*

The bottom of the weighing tank is preferably tapered and terminates in an elbow 21 (Fig. 2). Connected to the elbow is a section of flexible tubing or conduit 22 of any well known form and it is preferably horizontal or normal to the movement of the weighing tank, so that it will exert a minimum of resistance to movement of the latter. A pair of horizontal pipes 23 and 24 are connected to conduit 22 by means of a T 25.

Pipe 24 is connected to a pump 26 of any well known form, driven by an electric motor 27. The pump and motor are supported by a standard 30. The suction side of the pump is connected to a pipe 28, an elbow 29 and a pipe 31. The latter extends to a point near the bottom of reservoir A and carries a check or foot valve 32 of any well known form at its lower end, so as to automatically maintain the system full of liquid once it has been placed in operation. The reservoir is also provided with a pipe 33 carrying a combined filler cap and breather valve 34 for allowing air to enter the reservoir and replace the liquid as it is withdrawn.

*Bleed or liquid return system*

Connected to pipe 23 is a valve 35 having an operating lever 36 and supported by a standard 37. Connected to valve 35, by means of a pipe 38 and an eblow 39 is a pipe 41, and the latter communicates with the bottom of the storage reservoir by way of an elbow 42 and a pipe 43.

When valve lever 36 is disposed in the position shown in Figs. 1, 3, 5 and 6 it places pipe 23 in communication with the dispensing line, whereas when it is in the position shown in Fig. 4 it connects pipe 23 to the return line. Valve 35 is preferably actuated by a solenoid 44, having a winding 45 and mounted in a box 46 carried by a bracket 47. The latter is supported on standard 37.

The solenoid has a plunger 48 which is connected to lever 36 by means of a link 49. The parts are accordingly so designed that when the solenoid is energized plunger 48 is raised and the valve 35 actuated to bleed liquid from the weighing tank to the storage reservoir, and when the circuit is broken the plunger returns to the position of Fig. 1 and places the weighing tank in communication with the dispensing line. If desired a spring may be employed to assist the return operation.

*Dispensing line*

Connected to valve 35 is a flexible hose 51 having a nozzle 52 at its end. The nozzle is adapted to be inserted in the vessel to which the weighed liquid is to be transferred, in this instance the gasoline tank of an automobile, and it preferably embodies a valve having an operating handle 53 for controlling the flow at the point of delivery.

Mounted on a pivot 54 on any suitable part of the apparatus, such as an arm 55 carried by frame 14, is a switch box 56, which is so balanced as to normally tend to assume the position shown in Fig. 6. Box 56 is provided with a mercury switch 57, and a hook 58 for supporting nozzles 52 in inoperative position. As shown in Fig. 1, the weight of the nozzle and hose maintains the switch box in such a position as to maintain switch 57 closed. Switch 57 is in the motor circuit and this novel construction is provided to insure that the motor circuit will be open unless the dispensing nozzle is disposed in idle or inoperative position, as will be hereinafter more fully pointed out.

*Pumping circuit*

The electric power for the system may be of any suitable character and in the present instance I have designated the power lines as 59 and 61. Motor 27 is directly connected to one side of the line by means of a wire 62 which is connected to terminal 61.

The other side of the line is connected by means of a wire 63 having a flexible section 64, to a mercury switch 65.

Switch 65 is carried in a box 66 which is pivoted at 67 to an arm 68. The latter is carried by an arm 69 which is in turn supported on a standard 71 carried by frame 14. The switch is actuated by the scale beam through a link 72 pivotally connected to the beam at 73 and to a lever 74 at 75. Lever 74 is pivoted to standard 71 at 76 and to switch box 66 at 77.

In the position shown in Fig. 1 the scale is exactly balanced, with the result that switch 65 has broken the circuit. Connected to the other side of switch 65 is a wire 78 having a flexible section 79, so that it will not impede movement of box 66. Wire 78 leads to switch 57 by way of a flexible section 81. Since the nozzle is supported in idle position in Fig. 1 the switch is closed. The other side of the switch is connected to a hand operated or selective switch 82, by means of a wire 83 having a flexible section 84.

Switch 82 embodies a pair of live contacts 85 and 86 and a pair of insulated contacts 87 and 88. Wire 83 is connected to contact 85. The contacts are adapted to be bridged by an arm 89 pivoted on a shaft 90 and having a ratchet toothed gear 91 mounted thereon. Pivoted on shaft 90 is a lever 92 carrying a pawl 93 which cooperates with gear 91. Pivoted to lever 92 is a link 94 which is urged downwardly by a spring 95 and terminates in a knob 96. Therefore, by grasping knob 96 and pushing link 94 upwardly pawl 93 is carried back and drops behind the next tooth of ratchet 91, and upon release of knob 96 spring 95 depresses link 94 and advances arm 89 one-quarter revolution, so as to bring the arms from the open circuit shown in Fig. 1 to a position where arm 89 bridges contacts 85 and 86.

Connected to contact 86 is a wire 98, which leads to the other side of motor 27 and thus completes the motor circuit.

Summarizing the motor circuit, the motor cannot be operated unless the weighing tank is less than full, by reason of mercury switch 65; the nozzle is in idle position on hook 58 because of switch 57; and hand switch 82 is closed.

*Return or bleed circuit*

The circuit of the solenoid for actuating valve 35 is so designed that it cannot be closed unless the poise is in its outermost position and the tank contains more than the maximum weight the apparatus will handle.

Solenoid 44 is directly connected to one side of the line by means of a wire 101, which leads to terminal 59. Connected to terminal 61 is a wire 102, which leads to a mercury switch 103 carried by a switch box 104 pivoted at 105 on scale beam 11. Switch box 104 is pivoted off-center so that it normally tends to assume the position shown in Fig. 5 and break the circuit. However, it is provided with a finger 106 so that it is maintained in the position shown in Fig. 1 by engagement with the poise when the latter is disposed in its outermost position on the scale beam. This novel feature is provided so as to open the circuit and avoid bleeding liquid back into the storage reservoir when the poise is moved to dispense a predetermined weight of liquid.

Connected to the other side of switch 103 is a wire 107, which leads to a second mercury switch 108 carried by switch box 66. Switch 108 is inclined so that in the balanced position of Fig. 1 the switch is open. A wire 109 connects switch 108 to the other side of the solenoid and thus completes the solenoid circuit.

The solenoid circuit accordingly cannot be closed unless the weighing tank contains more liquid than that indicated by the poise, (switch 108) and the latter will maintain the circuit open (at switch 103) unless it is in its maximum measuring position.

*Vapor return system*

Since gasoline and many other liquids which it may be desired to sell by weight are volatile and considerable loss would be occasioned by release of vapors, I have designed an apparatus which in effect constitutes a hermetically sealed system.

Connected to the upper end of the weighing tank by means of a pipe 111 and an elbow 112 is a preferably horizontally disposed flexible hose 113, so as to not impede up and down movements of the tank. A plurality of pipes 114, 115 and 116 and elbows 117, 118 and 119 place hose 113 in fluid communication with the upper part of storage reservoir A. Therefore, when liquid is pumped into tank B the body of liquid functions as a piston and forces any vapors formed through pipes 113, 114, 115 and 116 into the top of the reservoir. On the other hand, when the liquid is withdrawn from the weighing tank vapors are drawn from the return line back into the weighing tank. In other words, a free transfer of vapor takes place without loss to the atmosphere.

*Operation*

*Filling operation.*—Assuming that the pump is primed; the weighing tank is empty; and knob 96 is pushed up and released to cause arm 89 to bridge contacts 85 and 86, the scale beam is inclined as shown in Fig. 3, switch 65 is closed; and that the nozzle is on its hook so as to close switch 57; the pump circuit is completed and pump starts to feed liquid to the weighing tank.

The positions the parts assume during this operation are illustrated in Fig. 3, and this figure shows that so long as the scale beam is inclined as shown switch 108 remains open and renders the return circuit incomplete, notwithstanding the fact that switch 103 is closed, and valve 35 is closed.

As the filling operation proceeds tank B ultimately overcomes the weight of poise 16 and when substantial balance is attained and pointer 18 registers with pointer 19, the scale beam, through link 72 and lever 74, rocks switch box 66 into such a position that switch 65 opens and breaks the circuit and stops the pump. As this occurs the feed pipes are maintained full of liquid by reason of foot valve 32.

The tank is now filled with a predetermined weight of liquid, the parts appear as shown in Fig. 1, and the liquid may be dispensed by way of nozzle 52.

*Bleeding or return operation.*—However, should the filling operation just described proceed to the point where the weighing tank contains a weight of liquid in excess of that indicated by poise 16, the scale beam will assume the position shown in Fig. 4, and through link 72 and lever 74 switch box 66 will assume the position shown and close switch 108, and since switch 103 is already closed the return circuit is complete and the solenoid is energized, which causes valve 35 to open and bleed liquid from the bottom of the weighing tank to the return line. As the bleeding operation proceeds tank B becomes lighter, and poise 16 slowly rocks it in a clockwise direction, slowly rocking switch box 66, and when a balanced condition is attained, switch 108 opens the circuit and valve 35 closes, thereby stopping the return flow. Under these conditions the parts assume the positions shown in Fig. 1.

*Dispensing a predetermined weight of liquid.*—Assuming that the liquid vended is gasoline, and the customer calls for a definite quantity, say two pounds, the operator moves poise 16 to the two pound mark. Since this results in the scale beam taking the position shown in Fig. 5, switch 108 closes and would normally close the return circuit and start to bleed liquid from the system until balance was again attained. However, the act of moving poise 16 away from the end of the scale beam allowed switch box 104 to pivot into the position shown in Fig. 5, thereby opening switch 103 and breaking the return or bleed circuit.

Assuming that the operator inserts nozzle 52 into the filler neck of the vehicle tank and operates handle 53 to feed gasoline from the weighing tank, he will observe pointers 18 and 19, and when they are aligned, he stops the flow as the system is balanced and the requested weight of two pounds has been dispensed. He now returns the nozzle to its hook and poise 16 to its extreme right-hand or full position. This completes the pump circuit through switches 57 and 65 and the pump, with no further attention, automatically fills the weighing tank in the manner previously described.

*Dispensing an indeterminate weight of liquid.*—Assuming that the weighing tank is full and the parts assume the position shown in Fig. 1 and a customer requests that his tank merely be filled up, the operator merely removes the nozzle from its hook and proceeds to dispense the required amount of gasoline. Although the scale beam will take the inclined position shown in Fig. 3 as soon as any appreciable weight of liquid is dispensed, and this causes switch 65 to close, the pump circuit is maintained open by switch 57, which remains open so long as the nozzle is not replaced on the hook. When the required weight of gasoline has been dispensed the operator operates knob 96 to open switch 82, so that when he replaces the nozzle on its hook the pump motor will not be restarted. He then slides poise 16 to the left until pointers 18 and 19 indicate a balance is attained. The weight of liquid dispensed may then be read directly from the scale beam. Upon completion of the sale just described the operator actuates knob 96 to close switch 82, whereupon pump 26 will automatically fill the weighing tank in the manner previously described.

The apparatus is accordingly accurate and yet flexible as regards the method of weighing desired, it measures liquids by weight and is not affected by temperature or altitude changes, and is rugged and requires a minimum of servicing to maintain it in proper working order.

Although I have shown and preferably employ electric means for operating the various parts, it is to be understood that if desired they may be operated by any other equivalent means, properly interrelated to effect the results, without departing from the invention. Also, the mercury switches may be replaced by any other suitable well known switch, but I preferably employ mercury switches as they manifest a minimum resistance to movement and do not introduce errors into the weight determination.

Valve 35 has been disclosed as a three-way valve so that when the bleeding operation is proceeding, hose 51 is blocked off, so that no liquid can be dispensed while the bleed operation is taking place.

It should be observed that pipes 23, 24 and 28 form in effect a stationary manifold which contains all of the essential liquid controlling elements of the apparatus. The weighing tank, being connected to the manifold solely by flexible hose 22 is not influenced by any outside forces, and moves with minimum resistance.

I claim:

1. In an apparatus for dispensing liquid according to weight, a storage reservoir, a weighing tank, weighing means supporting said tank, feeding means for conveying liquid from said reservoir to said tank, cut-off means responsive to said weighing means for automatically stopping said feeding means approximately when a predetermined weight of liquid has been introduced into said tank, and bleed means, responsive to said weighing means, for automatically returning to said reservoir any liquid in excess of said predetermined weight fed into said tank, said feeding means comprising an electric pump and said cut-off means comprising means for breaking the circuit of said pump after said weighing tank has moved into a predetermined position under the weight of said liquid.

2. In a liquid weighing apparatus, a weighing tank, mechanism supporting said tank for up and down movement including control means automatically movable in accordance with movement of said tank; a pair of electric switches operably associated with said control means, liquid feeding means for supplying said tank with liquid and embodying electrically operated means in the circuit of one of said switches; bleeding means for bleeding excess liquid from said tank and embodying electrically operated means in the circuit of the other of said switches, said switches being so related to said control means that when less than a predetermined weight of liquid is in said tank said one switch will be automatically closed and cause said feeding means to feed liquid into said tank, and when greater than said predetermined weight of liquid is in said tank said other switch will be automatically closed and cause said bleeding means to bleed liquid from said tank.

3. In a liquid weighing apparatus, a weighing tank mounted for up and down movement; control means operably associated with said tank and movable in accordance with movements thereof; a pair of mercury switches carried by said control means and disposed in fixed relationship to each other; liquid feeding means for supplying said tank with liquid and embodying electrically operated means in the circuit of one of said switches; bleeding means for bleeding excess liquid from said tank and embodying electrically operated means in the circuit of the other of said switches; said switches being disposed at such attitudes with respect to said control means and to each other that said one switch will be automatically closed and cause said feeding means to supply said tank with liquid when less than a predetermined weight of liquid is in said tank, and said other switch will be automatically closed and cause said bleeding means to bleed liquid from said tank when the latter contains more than said predetermined weight.

4. The apparatus defined in claim 3, wherein said control means comprises a scale beam; a rockable support; and a force transmitting connection between said scale beam and said support, said mercury switches being rigidly carried by said support.

5. The apparatus defined in claim 3, wherein said feeding means comprises a pump, and said bleeding means comprises a solenoid controlled valve.

6. The apparatus defined in claim 2, together with a third switch in series with said feeding means and having means urging it toward open circuit condition and embodying a hose retaining support, a dispensing hose for said tank, and having sufficient weight to maintain said third switch closed when it is placed on said hose retaining support.

7. In a liquid weighing apparatus, a weighing tank; a weighing mechanism supporting said tank for up and down movement and embodying a weighing beam and a slide poise, means for feeding liquid to said tank, means for automatically rendering said feeding means inoperative when a predetermined weight of liquid has been introduced into said tank, return means for automatically discharging from said tank any liquid in excess of that indicated by said slide poise, said return means being inoperative to discharge liquid from said tank when said slide poise is moved to indicate any quantity less than the maximum weight of liquid which the apparatus is capable of weighing.

8. The apparatus defined in claim 7, wherein said return means embodies a member engageable with said slide poise and adapted to be held in operative position when the latter is disposed in maximum liquid weighing position.

9. The apparatus defined in claim 7, wherein said return means comprises an electrical circuit containing a solenoid controlled valve and a switch mounted for movement into an operative and an inoperative position, and said slide poise is adapted to maintain said switch in operative position when the former is disposed in maximum liquid weighing position.

10. In a liquid weighing apparatus, a weighing tank; a weighing mechanism embodying a weighing beam and a slide poise, said mechanism supporting said tank for up and down movement; pump means for feeding liquid to said tank, cut-off means for automatically stopping said pump when a predetermined weight of liquid has been introduced into said tank, means for automatically discharging from said tank any liquid in excess of the weight indicated by said poise, comprising an electric circuit containing in series a solenoid-operated bleed valve and a pair of switches, one of said switches being automatically actuated in accordance with movements of said scale beam and the other being held in closed position by said poise only when the latter indicates the maximum weight of liquid the apparatus is capable of handling, whereby liquid can only be bled from the system when it contains an excess weight of liquid and said poise is in full position.

11. The apparatus defined in claim 10, wherein said pump means comprises a circuit containing in series said cut-off means, an electric pump and a switch which is operable to maintain said circuit open when liquid is being dispensed from said tank.

12. The apparatus defined in claim 10, wherein said switch which is adapted to be held in closed position comprises a member rockable about a fixed pivot and constantly tending to rock from a circuit closing position to a circuit opening position, the pivot for said member being so located that movements of said weighing beam are ineffective to rock said member.

MANUEL MARTINEZ DE CASTRO.